(12) United States Patent
DiLorenzo, Sr.

(10) Patent No.: US 8,231,132 B2
(45) Date of Patent: Jul. 31, 2012

(54) HEAVY DUTY WHEELBARROW

(76) Inventor: Ronald Louis DiLorenzo, Sr., Endicott, NY (US)

( * ) Notice: Subject to any disclaimer, the term of this patent is extended or adjusted under 35 U.S.C. 154(b) by 201 days.

(21) Appl. No.: 12/220,290

(22) Filed: Jul. 23, 2008

(65) Prior Publication Data

US 2010/0019472 A1 Jan. 28, 2010

(51) Int. Cl.
*B62B 3/12* (2006.01)
(52) U.S. Cl. .................................................. 280/47.31
(58) Field of Classification Search ............. 280/47.3, 280/47.31, 47.315, 47.34, 62, 79.2; 188/19, 188/20
See application file for complete search history.

(56) References Cited

U.S. PATENT DOCUMENTS

| 50,248 | A | * | 10/1865 | Holcroft et al. | 188/19 |
| 489,997 | A | * | 1/1893 | Sweet | 188/20 |
| 2,716,031 | A | * | 8/1955 | Roessler | 280/47.31 |
| 4,252,334 | A | * | 2/1981 | Filkins | 280/47.26 |
| 4,640,520 | A | * | 2/1987 | Wing et al. | 280/47.31 |
| 4,767,128 | A | * | 8/1988 | Terhune | 280/47.2 |
| 5,031,926 | A | * | 7/1991 | Wannamaker | 280/47.2 |
| 6,880,852 | B2 | * | 4/2005 | Lim | 280/653 |
| 7,140,630 | B2 | * | 11/2006 | Abel | 280/292 |
| 2003/0015852 | A1 | * | 1/2003 | Swift | 280/47.34 |
| 2003/0141686 | A1 | * | 7/2003 | Willis | 280/47.34 |

* cited by examiner

*Primary Examiner* — Frank Vanaman
(74) *Attorney, Agent, or Firm* — Mark Levy; Hinman, Howard & Kattell, LLP

(57) ABSTRACT

A heavy duty wheelbarrow/yard cart with two vertical fixed front wheels and one or two rear caster wheels for steering. An ergonomic pushbar handle is bolted to the frame and allows it to be pushed or lifted to dump the material. A brake keeps the wheelbarrow from moving on sloped terrain.

11 Claims, 13 Drawing Sheets

HEAVY DUTY WHEELBARROW

FIELD OF THE INVENTION

The present invention relates to a load carrying device and, more particularly, to a three or four wheeled heavy duty wheel barrow/yard cart, having a parking brake.

BACKGROUND OF THE INVENTION

Conventional wheelbarrows require the user to hold some of the load upright and to move the load with force. This requires the user to exert considerable, effort, which may result in wrist, back and shoulder pain.

Many patents reference wheelbarrows in the prior art. This includes U.S. Pat. No. 6,880,852 to Lim, for "Three Wheeled Wheelbarrow with Handle Adapter". U.S. Pat. No. 6,446,989, to Intengan, for "Pin Drive Wheel Barrow", and U.S. Pat. No. 4,767,128 to Terhune for "Wheelbarrow Construction".

U.S. Pat. No. 6,880,852 discloses, a designs has a handle converter and two fixed wheels at the rear, of a traditional wheelbarrow. The handle makes it easy to push the wheelebarrow but may offer discomfort to the user since it is made of square tubing. Also, being removable it is not a permanent piece to complement the unit. Fixed rear wheels do not make it easy to maneuver as the user still needs to lift the wheelbarrow in order to turn at a sharp radius.

U.S. Pat. No. 6,446,989 discloses a closed loop handle which is adjustable in height, and two rear wheels which rotate 360 degrees. The handle is pivotaly mounted and has an adjusting point which over usage is susceptible to breakage due in part to the hole drilled in the closed loop handle. Also to lift and dump load continually may cause fatigue in these drilled areas.

U.S. Pat. No. 4,767,128 discloses an adjustable handle that, when released or dropped, automatically actuates the brake to restrain the rear wheels. This design contains many parts, making the unit heavy. Not only does the user have to lift the weight of the load to dump, he also has to lift the added weight of the wheelbarrow. The many features of this apparatus also may weaken it due to the many movable parts that are involved.

It would be advantageous to provide a three or four wheeled heavy duty wheelbarrow/yard cart that is stable and carries the load using two front fixed wheels. Allowing the wheelbarrow/yard cart to be steered without having to lift the load.

It would also be advantageous to provide a rounded comfortable ergonomic pushbar handle at an appropriate height for ease of use.

It would further be advantageous to provide a brake that keeps the wheelbarrow from moving while loading, especially on a sloped terrain.

SUMMARY OF THE INVENTION

In accordance with the present invention, there is provided a three or four wheeled heavy duty wheelbarrow/yard cart having two front fixed wheels with a frame that extends through the main body of the unit. This unit also has a fixed position rounded ergonomic pushbar handle that attaches to the frame. A single or double rear wheel are bolted to the crossmember and swivels 360 degrees, thus allowing it to be steered without having to lift and support the weight it carries. This invention features a brake that can be applied to keep the wheelbarrow/yard cart from moving while loading.

BRIEF DESCRIPTION OF THE DRAWINGS

A complete understanding of the present invention may be obtained by reference to the accompanying drawings, when considered in conjunction with the subsequent, detailed description, in which.

For purpose of clarity and brevity, like elements and components will bear the same designations and numbering throughout the Figures.

DESCRIPTION OF THE PREFERRED EMBODIMENT

Figure 1:
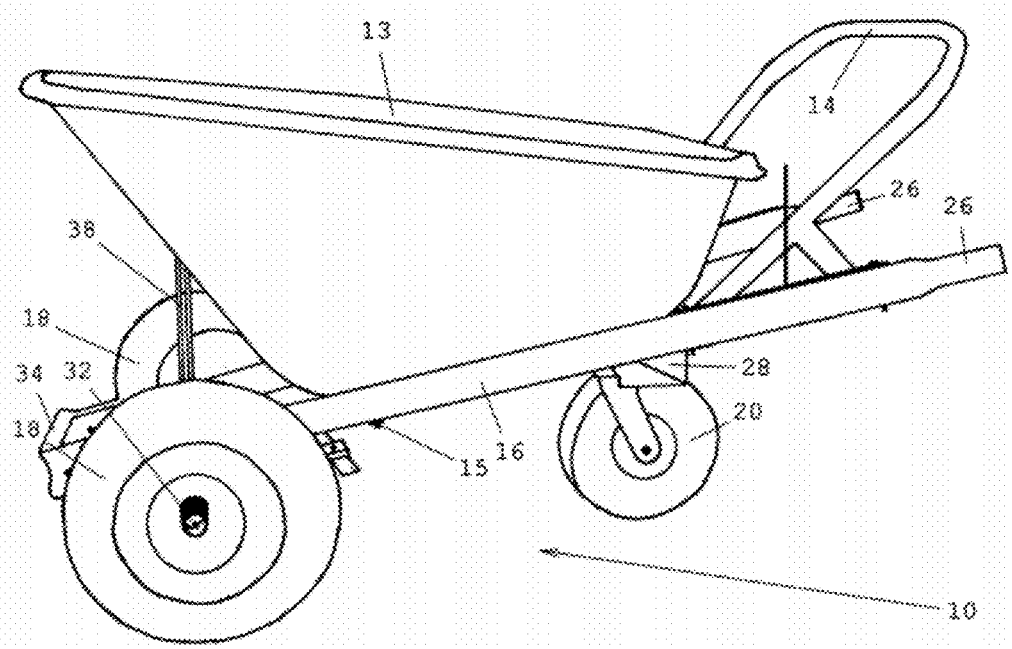
FIG. 1 is a right plan view of a three wheeled heavy duty wheelbarrow.

FIG. 1 is a left perspective view of a three wheeled heavy duty wheelbarrow 10. The frame handle 26 is countered round form the square frame 16. Four container bolts 15 are used to fasten the container 13 to the frame 16. The three wheeled heavy duty wheelbarrow 10 has one rear caster wheel mounted in the center of the crossmember 28. The rear caster wheel 20 mounted in the center of the crossmember 28 functions as a steerable wheel to turn and support the load. This crossmember 28 has the same angle bends as the four wheeled heavy duty wheelbarrow 11, but is 20" wide instead of 24" wide. The front axle brake support 32 supports the front wheels 18 in a vertical position. This also supports both brake bars. A tipping point brace 34 holds the frame 16 into place and also serves as a tipping point for emptying material from the wheelbarrow container 13. A bin support 38 braces the container 13 during large material loads. The bin support 38 is made from 1⅛" wide flat stock that is 13¼"long. This has one 80 degree bend that bolts to the frame 16. The other end is bent at 20 degrees and bolts to the container 13. The ergonomic pushbar handle 14 is made from round stock and is welded to the ergonomic pushbar handle base 21 that is 2" wide and 13" long with two ⅜" ergonomic pushbar handle holes 19 drilled in either end that bolt to the frame 16. The ergonomic pushbar handle 14 and crossmemeber 28 use the same mounting holes and bolts in the front holes of the ergonomic pushbar handle base 21, and go through the frame 16. the same ergonomic pushbar handle 14 is used on the four wheeled heavy duty wheelbarrow 11/ yard cart 12.

Figure 2:
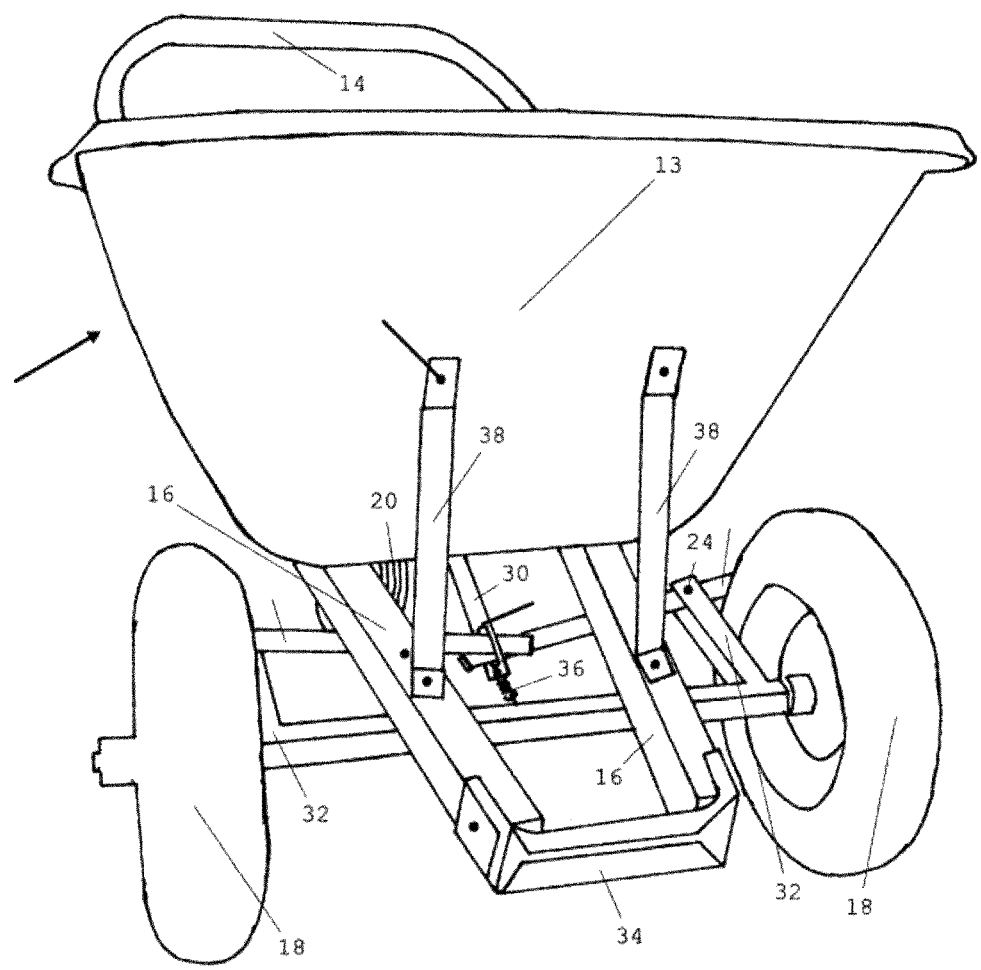
FIG. 2 is a front detailed view of the three wheeled heavy duty wheelbarrow shown in FIG. 1.

FIG. 2 is a front perspective view of a three wheeled heavy duty wheelbarrow 10. A tipping point brace 34 connects both pieces of the frame 16 together and also serves as a tipping point to empty the material from the wheelbarrow. The bin support bolt 43 fastens the container 13 to the bin support 38. The brake bar 22 having a ¼" brake bar hole 24 drilled in it is connected with a bolt to pivot on, and passes through a cutaway slot in the axle brake support 32 also having a hole drilled through it. The cutaway slot is 1½" in length, ¼" wide and is in the center of the square tube of the axle brake support 32. This end of the brake bar 22 applies force to the front tire to lock it into place. The other end of the brake bar 22, passes through the brake controller rectangle opening 44 and has a 90 degree angle that keeps it from being removed from the brake controller 30. The brake controller 30 is made from 1" flat metal stock, and is twisted in at 10½" from the front to form a 90 degree angle, so that one end of the brake controller 30 is vertical and the other end is horizontal. The brake bars pivot against each other but are not connected in any way. The axle brake support 32 has a return spring mount welded to it, for the brake return spring 36 to attach to. On the other end it is connected to the brake controller 30 and has a hole drilled in it to attach the brake return spring 36. A brake return spring 36 makes the brake function properly. The axle brake support 32 used is the same for three wheeled heavy duty wheelbarrow 10 or four wheeled heavy duty wheelbarrow 11 yard cart 12 and having the same specifications.

Figure 3:
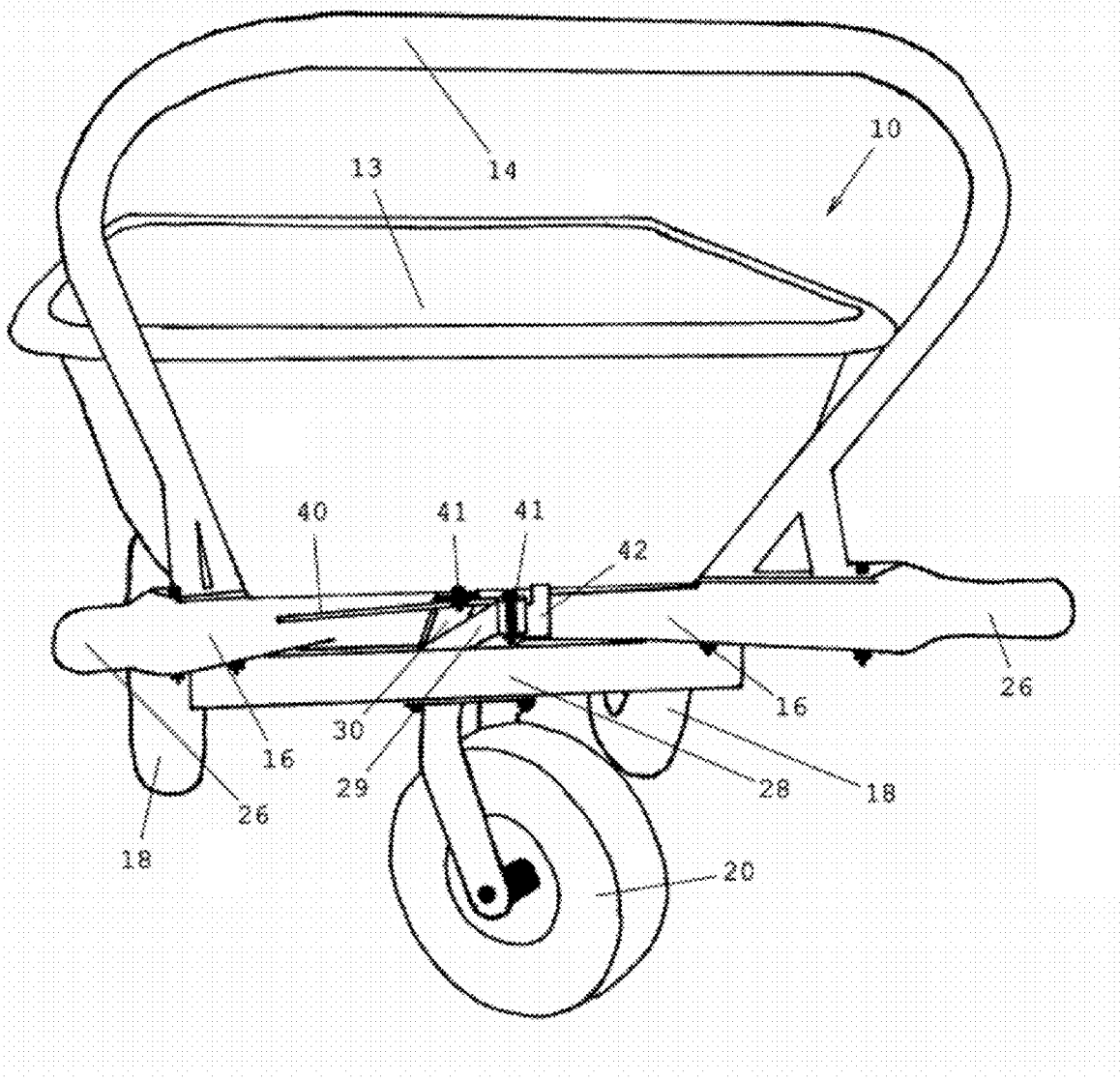
FIG. 3 is a rear detailed view of the three wheeled heavy duty wheelbarrow shown in FIGS. 1 and 2.

FIG. 3 is a rear perspective view of the three wheeled heavy duty wheelbarrow 10, with a view of the container 13 bolted to the frame 16. Ergonomic pushbar handle 14 is bolted to the frame 16. The crossmember 28 is made from channel steel and has a square tube welded to it that makes the brake handle mount 29. The square tube is cut 7" long from one corner end to the other side of square the tube. This allows for the right angle to mount to the crossmember 28, then is welded to the crossmember 28. A single rear caster wheel 20 is then bolted to the crossmember 28. The brake controller 30 has a hole drilled therein about ¾" from the end. A bolt passes through the hole and a flat washer is installed between it and bolted to the brake handle 40. The other end of the brake controller 30 has a hole drilled in it ½" from the end to attach the brake return spring 36. This end of the brake return spring 36 is then attached to the axle brake support 32. A shouldered threaded rod is welded to the brake handle 40. The brake handle 40 has a washer installed, then is bolted to the square tubing on the crossmember 28. A brake stop 42 is welded to the brake handle mount 29. The brake stop 42 limits the travel of the brake controller 30. This also applies the correct amount of pressure to the front wheels 18 to immobilize them. To apply the brake to the wheelbarrow, turn the brake handle 40 counterclockwise until it contacts the brake stop 42. The brake return spring 36 applies tensional force to the brake controller 30. This expands the brake return spring 36 causing the brake bar 22 to contact the front wheels 18. Thus the brake controller 30 moves from left to right of the brake handle mount 29 and passes a center point. The brake handle 40 completes an arc motion to relocate the brake controller 30. This design is the same for the three wheeled heavy duty wheelbarrow 10 or four wheeled heavy duty wheelbarrow 11/yard cart 12.

Figure 4:
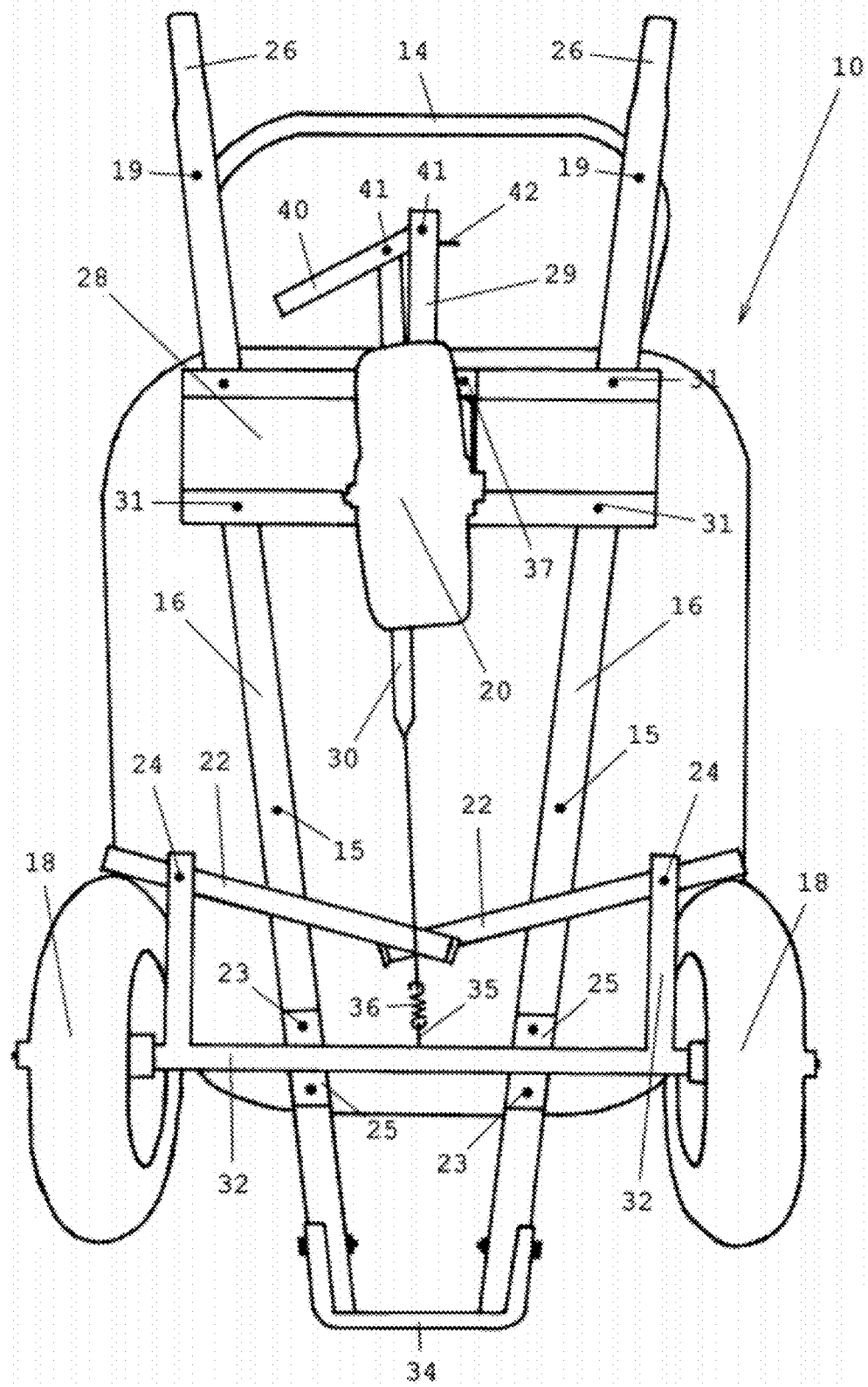
FIG. 4 is a bottom detailed view of the three wheeled heavy duty wheelbarrow shown in FIGS. 1, 2, and 3.

FIG. 4 is a bottom perspective view of the three wheeled heavy duty wheelbarrow 10. The brake controller 30 is attached to the axle brake support 32 with the brake return spring 36. The other end of the brake controller 30 has a ¼" brake handle hole 41 drilled in it to attach the brake handle 40. The brake handle 40 is bolted to the brake handle mount 29 that is welded to the crossmember 28. The brake handle 40 is made from 1" flat metal stock and has a shoulder threaded rod welded to it. The brake handle 40 is installed to a brake handle hole 41 drilled in the brake handle mount 29. The hole in the brake handle mount 29 is drilled in 1" from the end of the square tube and is ¼". This figure contains the same specifications as the four wheeled heavy duty wheelbarrow 11/yard cart 12.

Figure 5:
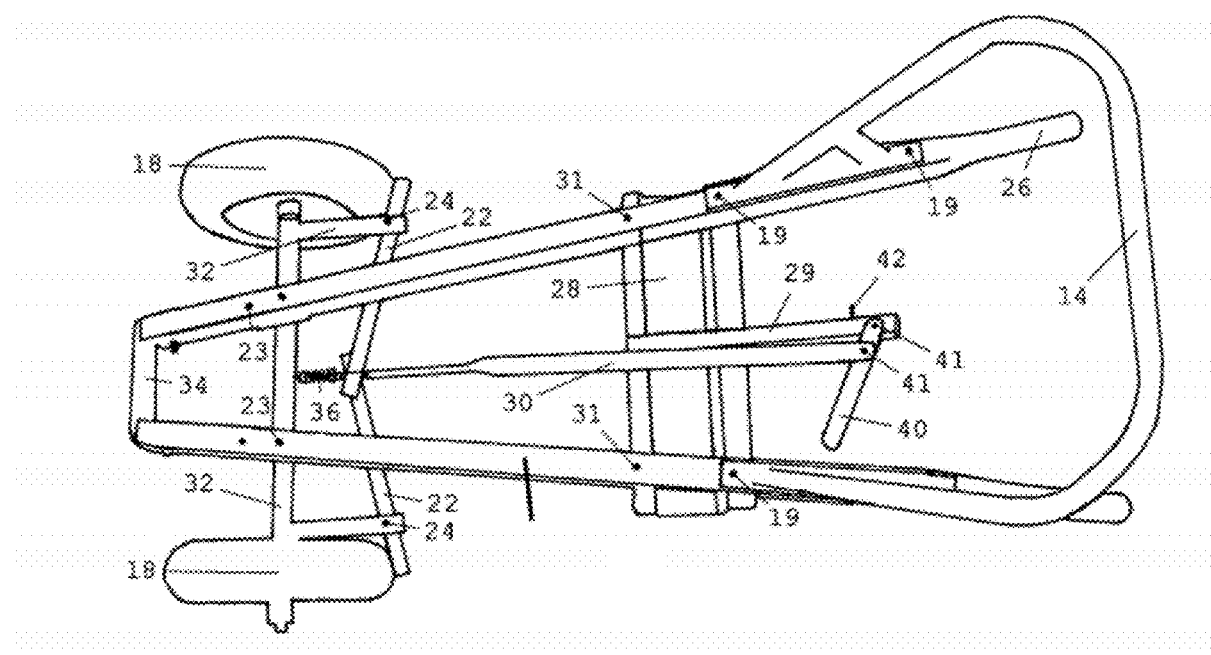
FIG. 5 is a top section view of a three or four wheeled heavy duty wheelbarrow/yard cart with the container removed.

FIG. 5 is a top perspective view of the frame 16 structure that is used by the three wheeled heavy duty wheelbarrow 10 or four wheeled heavy duty wheelbarrow 11/yard cart 12. This can either have one or two rear caster wheels bolted to the crossmember 28. The frame 16 connects the axle brake support 32 and crossmember 28. Both brake bar 22 are incorporated with the brake controller 30. The brake return spring 36 conducts all inertia to the brake system. The operation of the brake handle 40 puts this brake into motion, with the front wheels 18 bolted to the axle brake support 32 in a vertical position. This two front wheeled design supports the material where it is most contained. A ergonomic pushbar handle 14 is connected to the frame 16 to give the wheelbarrow a complete and beneficial usage. This is the same design for the three wheeled heavy duty wheelbarrow 10 or four wheeled heavy duty wheelbarrow 11/yard cart 12.

Figure 6:
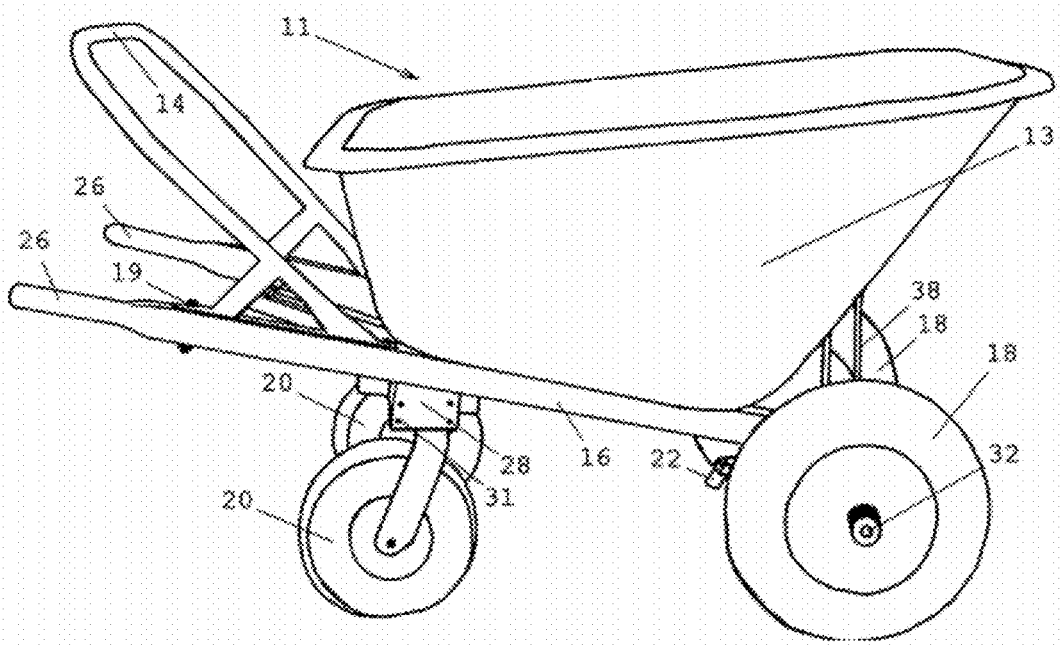
FIG. 6 is a right plan view of the four wheeled heavy duty wheelbarrow.

FIG. 6 is a right detailed view of a four wheeled heavy duty wheelbarrow 11. In accordance with the invention the container 13 functions to transport materials. This container 13 is made from plastic or metal and is bolted to the frame 16. An ergonomic pushbar handle 14 is made from round stock, allowing the wheelbarrow to be pushed and lifted to unload material from container 13. A pair of front wheels 18 supports the load and rotates about a horizontal axle. The front wheels 18 are attached to an axle brake support 32. The axle brake support 32 is made from square tube. The Axle brake support 32 has a cut away opening in the square tubing to allow a brake bar 22 to pass through. The crossmember 28 is made from channeled steel and is bolted to the frame 16. A pair of rear caster wheel 20 are then bolted to the crossmember 28 and functions to turn the wheelbarrow. This also allows the wheelbarrow to carry the load without having to lift the load it carries.

Figure 7:
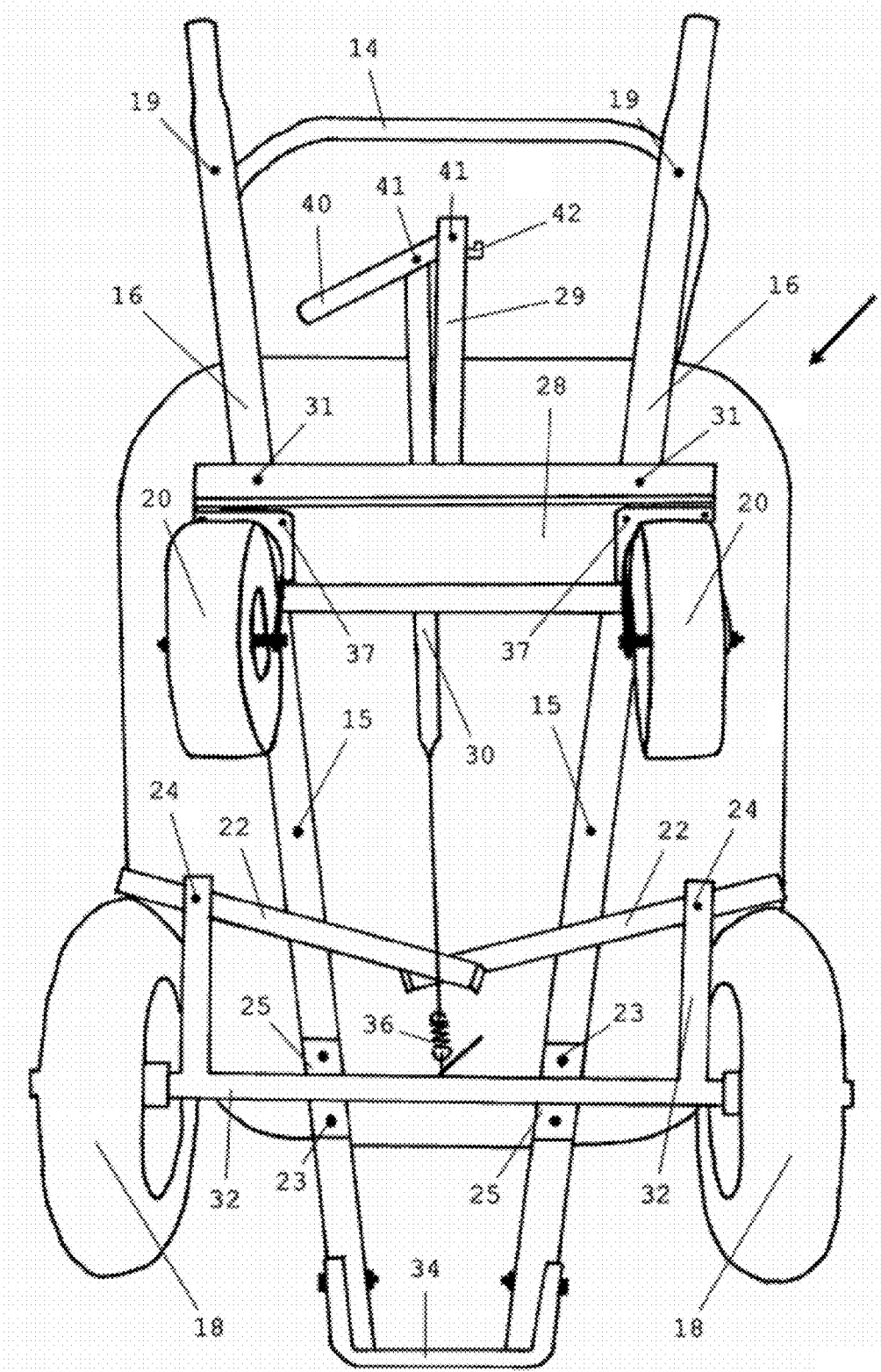
FIG. 7 is a bottom detailed view of the four wheeled heavy duty wheelbarrow shown in FIG. 6.

FIG. 7 is a bottom view of the four wheeled heavy duty wheelbarrow 11. The frame 16 is made from 2"×2" square wood and is 60" in length. A tipping point brace 34 is then bolted to the front of the frame 16. Axle brake support 32 bolts to the frame 16 of the wheelbarrow. This holds two fixed front wheels 18 in a vertical position, and are mounted to the axle brake support 32. The axle brake support 32 in the preferred embodiment is made from 1" square tube and is 21⅜" long. A pair of brake supports made from 1"×1" square tubing that are 7⅝" long, then welded in 5/16" to the axle brake support 32. This makes both pieces, the axle brake support 32 and the brake support, one piece. A return spring mount 35, is welded to the axle brake support 32, that the brake return spring 36 attaches to. The brake bar 22, which has a ¼" brake bar hole 24 drilled in it is connected with a bolt on which to pivot and passes through a cut away slot in the square tubing of the axle brake support 32. This end of the brake bar 22 presses against the left front tire to lock the wheel from turning. The other end of the brake bar 22 passes through the brake controller 30 which has a 90 degree angle that keeps it from being removed from the brake controller 30. The brake controller 30 is made from 1" flat stock steel and is 34¾" long. This brake controller 30 is twisted 90 degrees at 10½" in from the front end. In the rear of the wheelbarrow a crossmember 28 is bolted to both sides of the frame 16. The crossmember 28 is made from channeled steel. It is 24" wide and 9⅛" long. This is bent 80 degrees in at 1¾". The next bend is 90 degrees at 3 7/16", then continues and bends at 90 degrees at 7¼". The last bend is 80 degrees at 8⅛". The crossmember 28 has two functions: one that allows the brake system to work, the other to bolt rear caster wheels to it, where traditional wheelbarrow legs are bolted. A square tube is welded to the crossmember 28 and makes the brake handle mount 29. The brake handle mount 29 is made from 1"×1" square tubing and has a ¼" hole drilled in, 1" from the end. The brake handle 40 is bolted to the brake controller 30, then is bolted to the brake handle mount 29. The brake controller 30 continues under the container 13 to attach to the brake return spring 36.

Figure 8:
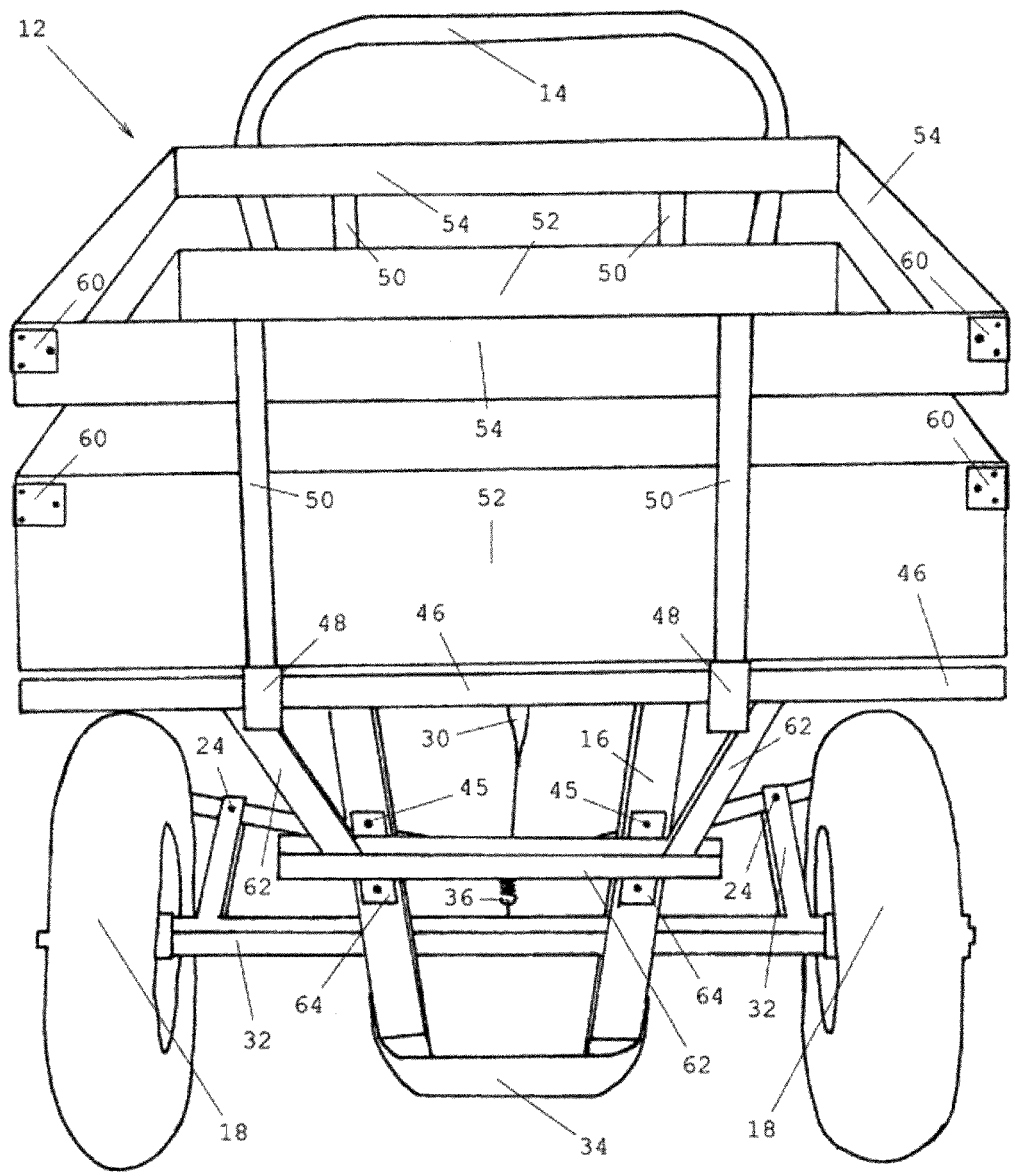
FIG. 8 is a front plan view of the heavy duty yard cart.

FIG. 8 is a front plan view of the yard cart 12. A container support 62 is made from 1"×1" square tube and is 15" long. This has a container support lower mount 64 that is 2" wide and 3½" long then welded to the bottom of the square tube, and placed 1⅞" from the end. A ⅜" container support mounting hole 45 is drilled and bolted to the frame 16, at the same point as the axle brake support 32. On the top of the square tubing two 1"×1" square tubing is welded and having a 20 degree angle cut on both sides of them. These two pieces are 9" long and have opposing 20 degree ends. A container support upper mount 65 is welded to both sides and measures 3½" wide×1¾" in height. This has two 5/16" container support 62 hole drilled in them and bolted to the floor support 58. The axle brake support 32 is made from 1"×1" square tubing and being 21⅜" long. Two axle brake support mount 25 are made from flat stock being 2" wide and 3½" long and having two axle brake support mount hole 23 drilled in them.

Figure 9:
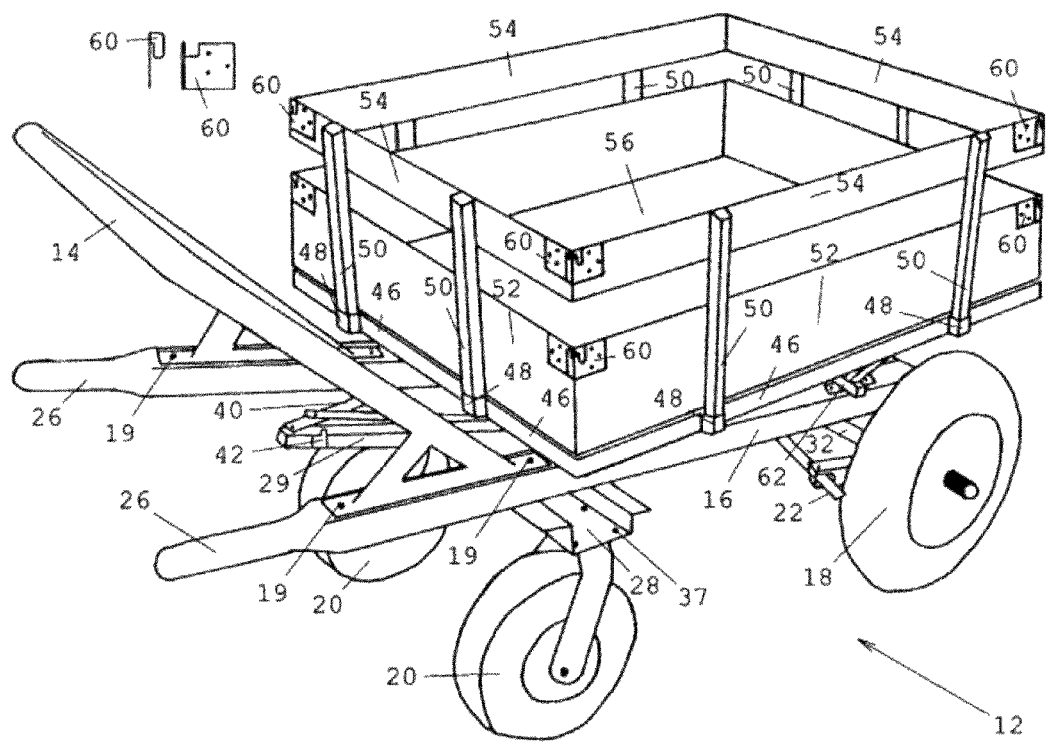
FIG. 9 is a side view of the heavy duty yard cart shown in FIG. 8.

FIG. 9 is a right side perspective view of the yard cart 12. The floor 56 is made from ½" plywood and cut 36"×30" then screwed to the cart frame 46 using self starting screws. The stake sockets 48 are made from 1⅛"×1⅛" square tube and being 1¾" long. This uses two stake sockets 48 in the front, two stake sockets 48 on the sides and also two stake sockets 48 in the rear. All positions of the stake sockets 48 are placed at 7¾" from the corner, and welded to the cart frame 46 cart. The stakes 50 are made from 1"×1" square tubing and are 13" long. There are two per each side. The left and right lower side board 52 are 5½" high on the bottom and 34¼" long. The front and rear lower side board 52 are 5½" height, and are 30" long. The left and right upper side board 54 are 34¼" long and a height of 2¾". The front and rear upper side board 54 are 2¾" high and 30" long. All these boards are attached by sheet metal screws. The stake rack lock 60 are used on lower board and upper board on the yard cart 12 to hold the sides together. They are interchangeable in that they lock together but when put together and also when lifting sides up to remove, they separate. The stake rack lock 60 bolt to the corner of the lower side board 52 and upper side board 54, using three bolts for each lock.

Figure 10:
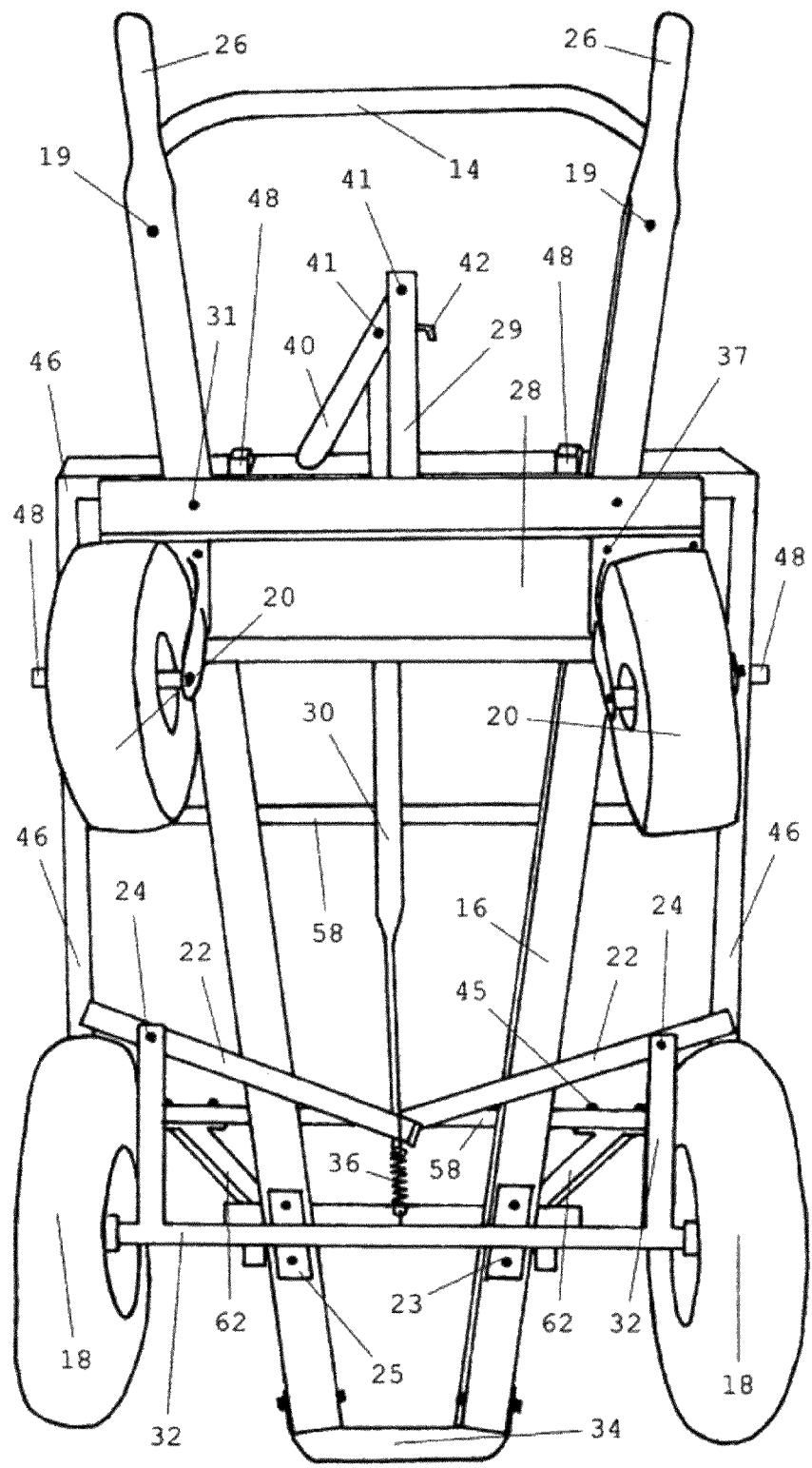
FIG. 10 is a bottom detailed view of the heavy duty yard cart shown in FIG. 9.

FIG. 10 is a bottom perspective view of a yard cart 12. The crossmember 28 is 24" wide and bolts to the frame 16. The cart frame bracket 67 is welded to the cart frame 46 in the rear then is bolted to the top of the frame 16. The cart frame bracket 67 is made from angle stock that is bent 90 degrees and having 1¼" base and 3" height. The 3" side is welded to the cart frame 46 in the rear. A cart frame mount hole 69 is drilled in the base and bolted to the frame 16. The container support 62 in the front is bolted to the top of the frame 16, at the same place where the axle brake support 32 bolts. The other end of the container support 62 then bolts to the floor support 58. The cart frame 46 is made from 1"×1" square tube with a left and right side being 36 inches long and cut 30 degrees on either end. The front and rear cart frame 46 is 30" long and being cut 30 degrees. This forms a rectangle shape when put together and welded. Two floor support 58 are then made from 1"×1" square tubing and being 28 inches long. The floor support 58 are then welded in place at 6¼" from the front and 14½" from the rear. The rear caster wheel 20 supports the yard cart 12 and bolts to the crossmember 28. They allow the user to steer the yard cart 12 without having to lift the load.

Figure 11:
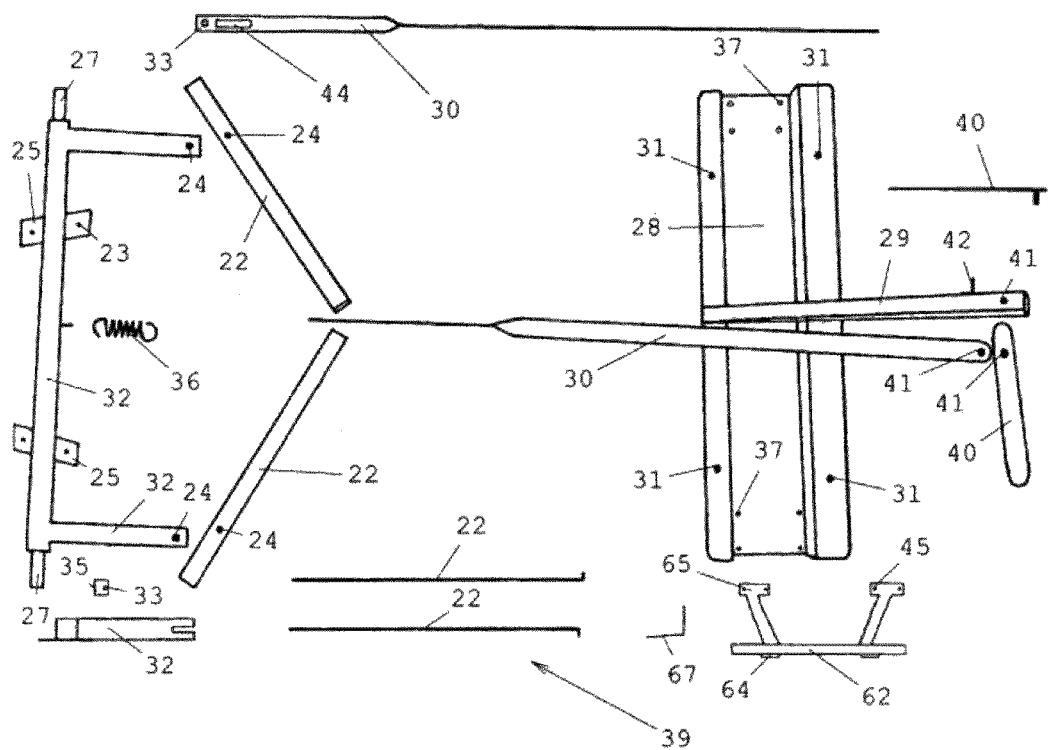
FIG. 11 is a top exploded view of the brake assembly for the three or four wheeled heavy duty wheelbarrow/yard cart.

FIG. 11 is a exploded view of the brake assembly 39 for the three wheeled heavy duty wheelbarrow 10 or four wheeled heavy duty wheelbarrow 11/yard cart 12. The brake bar 22 are made from 1" wide by ⅛" thick and being 15" long, using scaleless blue temper steel. A ¼" brake bar hole 24 is drilled at ⅞" from the end, this is where the brake bar 22 bolts to the axle brake support 32. The axle brake support 32 has a cut away of ¼" wide and 1 ½" in depth. The axle brake support 32 has a ¾" round stock bar inserted into the square tubing to mount the front wheels 18, to form the front wheel mount 27. This is 7" long and welded through a hole drilled in the square tubing of the axle brake support 32. The two front wheels 18 are attached to the front wheel mount 27 with a flat washer first then a cotter pin inserted through the hole to secure the front wheels 18. Two pieces of flat stock are welded to the top of the axle brake support 32. The flat stock is 2" wide×3½" in length, they form the axle brake support mount 25. Two axle brake support mount hole 23 are drilled ⅜", to bolt to the frame 16. The brake controller 30, brake handle 40 and crossmember 28 are the ingenuity to the brake. The brake bar 22 has a 90 degree bend in them to keep them in the brake controller rectangle opening 44. The brake controller 30 is made from 1" flat metal stock and is 34¾" in length. This is also twisted to a 90 degree angle at 10½" from the front end. So as one end is vertical and the other is horizontal, opposing each other. The brake controller 30 has a rectangle opening in shown in FIG. 11. This allows both brake bar 22 and to move freely through the brake controller 30 without being attached by a bolt. The rectangle opening is 2½" in length, ¼" wide and starts 1" from the front. The brake controller 30 has a ¼" brake handle hole 41 drilled in it ½" from the end to mount to the brake handle 40. The brake handle 40 is 8" long and made from 1" wide flat metal stock. It has a ¼" brake handle mount 29 hole drilled at 2³⁄₁₆" for the brake controller 30 to bolt to. A piece of flat stock being 1" long is welded in the center of the axle brake support 32, this is used for the brake return spring 36 mounting point, and having a return spring mount hole 33 drilled in it.

Figure 12:
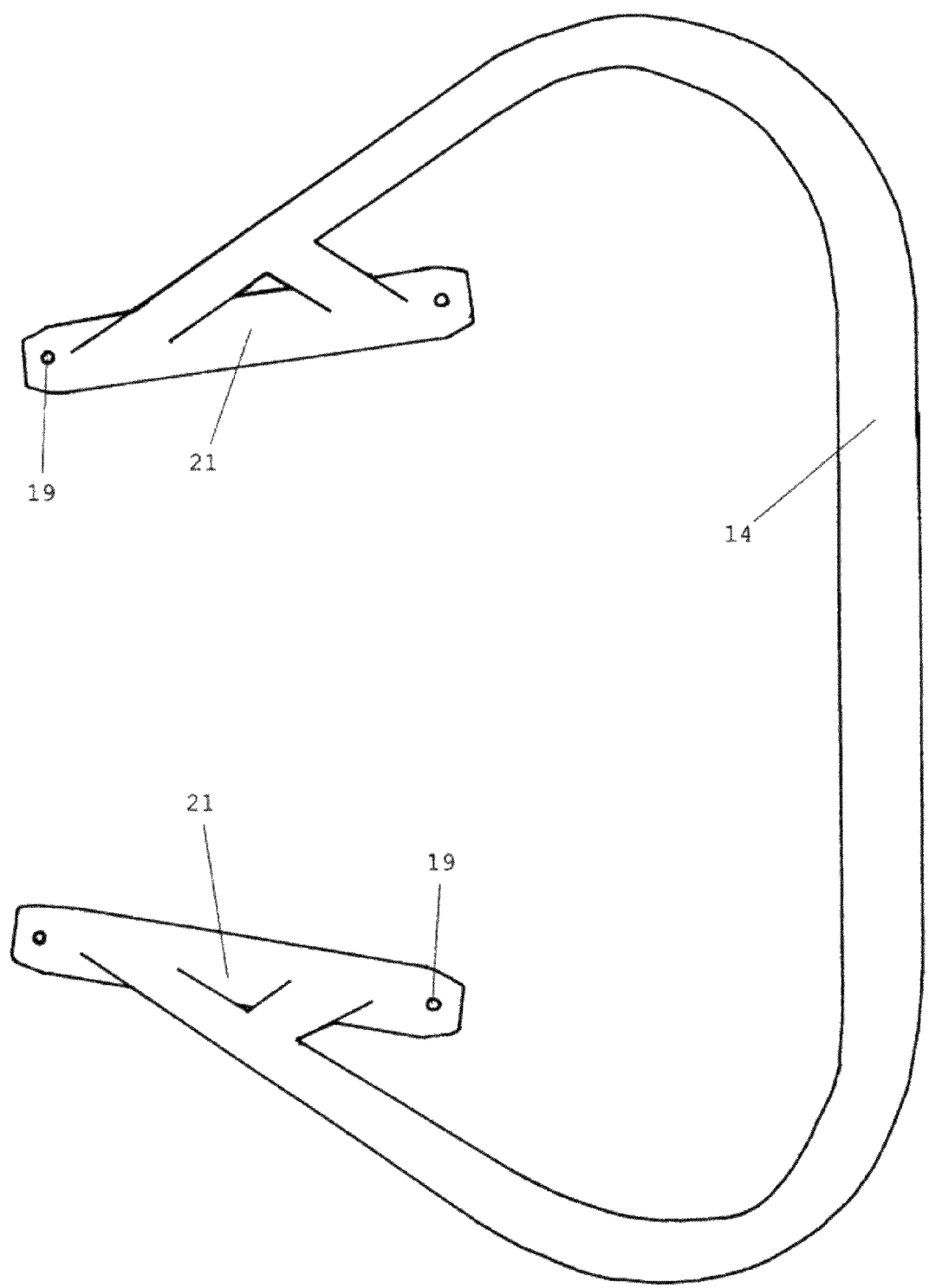
FIG. 12 is a top view of an ergonomic pushbar handle for use on the three or four wheeled heavy duty wheelbarrow/ yard cart.

FIG. 12 is a top view of the ergonomic pushbar handle 14. The ergonomic pushbar handle 14 is made from 1½" round tubing that is 70" long and is cut off at 20 degrees at either end. With a bend of 100 degrees starting at 15" from either side. A a ergonomic pushbar handle base 21 is made from 1/16" flat stock that is 2" wide by 13" long. There are two ⅜" ergonomic pushbar handle hole 19 drilled ¾" from either side to mount to the frame 16. The brace is made from flat stock 2" wide×4" long. One side is cut at 90 degrees and is welded to the handle. The other end is cut at 80 degrees and is welded to the ergonomic pushbar handle base 21.

Figure 13:
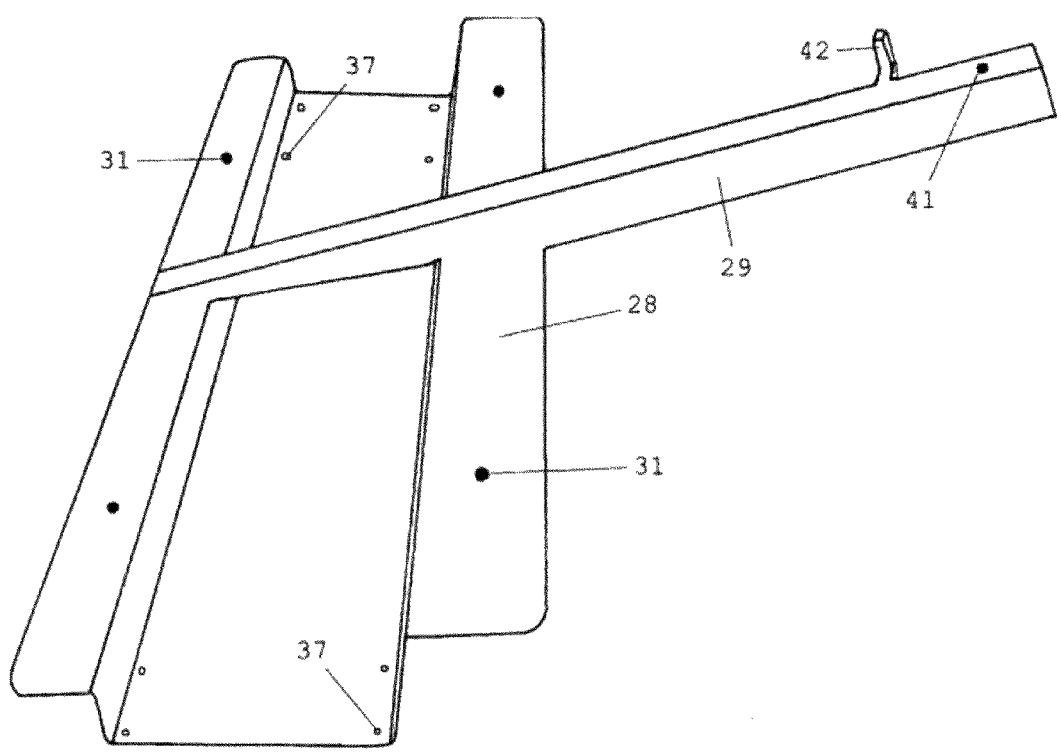
FIG. 13 is a side view of a crossmember used for the three or four wheeled heavy duty wheelbarrow/yard cart.

FIG. 13 is a side view of the crossmember 28. The brake handle mount 29 is made of 1"×1" square tube being 16" in length and having a ¼" brake handle hole 41 drilled in it. This square tubing is cut from one side corner to the other side, 7" in length, then welded to the crossmember 28. The brake stop 42 is placed ½" away from the square tubing to the right, and ¾" in height. A piece of 1"×1" inch angle stock that is 1¾" long is notched and welded to the brake handle mount 29. The brake stop 42 is welded 2⅜" from the end. The crossmember 28 is made from flat stock that is 9⅛" long by ⅛" thick and being either 20" or 24" wide. It has four bends in it, the first being 80 degrees at 1¾". Next bend is 90 degrees at 3⁷⁄₁₆" the third bend is 90 degrees at 7¼", the last bend is 80 degrees at 8⅛" from the end. This has either one or two rear caster wheel mount hole 37 drilled ⅜".

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A heavy duty wheelbarrow for moving heavy items with little effort, comprising:
   a) a frame having two opposing sides;
   b) a single one-piece ergonomic pushbar handle connected to said frame for pushing the wheelbarrow and allowing easy lifting;
   c) two front wheels operatively connected to said frame for moving the wheelbarrow; and
   d) a brake assembly comprising:
      i) two brake bars for locking each of said two front wheels, respectively, of the heavy duty wheelbarrow;
      ii) a brake controller and linkage for controlling and setting both of said brake bars, to lock said front wheels of said heavy duty wheelbarrow, said brake controller having a distal end connected to both of said brake bars, and a free end;
      iii) an axle brake support for supporting said front wheels in a vertical position;
      iv) a channeled crossmember attached to both of said frame sides;
      v) a brake handle mount having a first end connected to said channeled crossmember and an opposite free end;
      vi) a return spring for releasing said two brake bars; and
      vii) an exclusively hand-operated brake handle having a distal end connected to said free ends of said brake handle mount and said brake controller, both of said free ends including respective pivot points for allowing said brake controller to move relative to said brake handle mount for applying said two brake bars.

2. The heavy duty wheelbarrow for moving heavy items with little effort in accordance with claim 1, wherein said axle brake support is a square axle brake support.

3. The heavy duty wheelbarrow for moving heavy items with little effort in accordance with claim 1, wherein said single ergonomic pushbar handle comprises a round tube.

4. The heavy duty wheelbarrow for moving heavy items with little effort in accordance with claim 1, wherein said brake controller comprises a pass center device and said locking mechanism and said pass center device permits said brake controller to move from left to right of said brake handle mount and to pass a center point.

5. The heavy duty wheelbarrow for moving heavy items with little effort in accordance with claim 1, further comprising a rear wheel operatively connected to said frame.

6. A heavy duty wheelbarrow for moving heavy items with little effort, comprising:
   a frame having two opposing sides;
   a single ergonomic pushbar handle connected to said frame for pushing the wheelbarrow and allowing easy lifting;
   two front wheels operatively connected to said frame;
   two brake bars proximate each of said two front wheels for preventing movement thereof;
   a reciprocating brake controller for exclusively, manually controlling and setting both of said brake bars, locking said front wheels of said heavy duty wheelbarrow, said brake controller having a first end connected to both of said brake bars, and a free end;
   a crossmember attached to both of said frame sides;
   a brake handle mount having a first end connected to said crossmember and an opposite free end;
   a return spring for releasing said two brake bars; and
   an exclusively hand-operated brake handle having a distal end connected to said free ends of said brake handle mount and said brake controller, both of said free ends including respective pivot points for allowing said brake controller to move relative to said brake handle mount.

7. The heavy duty wheelbarrow for moving heavy items with little effort in accordance with claim 6, wherein said brake handle support is a square brake handle support.

8. The heavy duty wheelbarrow for moving heavy items with little effort in accordance with claim 6, wherein said ergonomic pushbar handle comprises a round tube.

9. The heavy duty wheelbarrow for moving heavy items with little effort in accordance with claim 6, wherein said brake controller is attached on one end to said two brake bars, and comprises a pass center device that permits said brake controller to move from left to right of said brake handle mount and to pass a center point.

10. The heavy duty wheelbarrow for moving heavy items with little effort in accordance with claim 6, further comprising a rear wheel operatively connected to said frame.

11. The heavy duty wheelbarrow for moving heavy items with little effort in accordance with claim 6, wherein said single ergonomic pushbar handle is connected both to said frame and to said crossmember.

\* \* \* \* \*